United States Patent Office 2,980,246
Patented Apr. 18, 1961

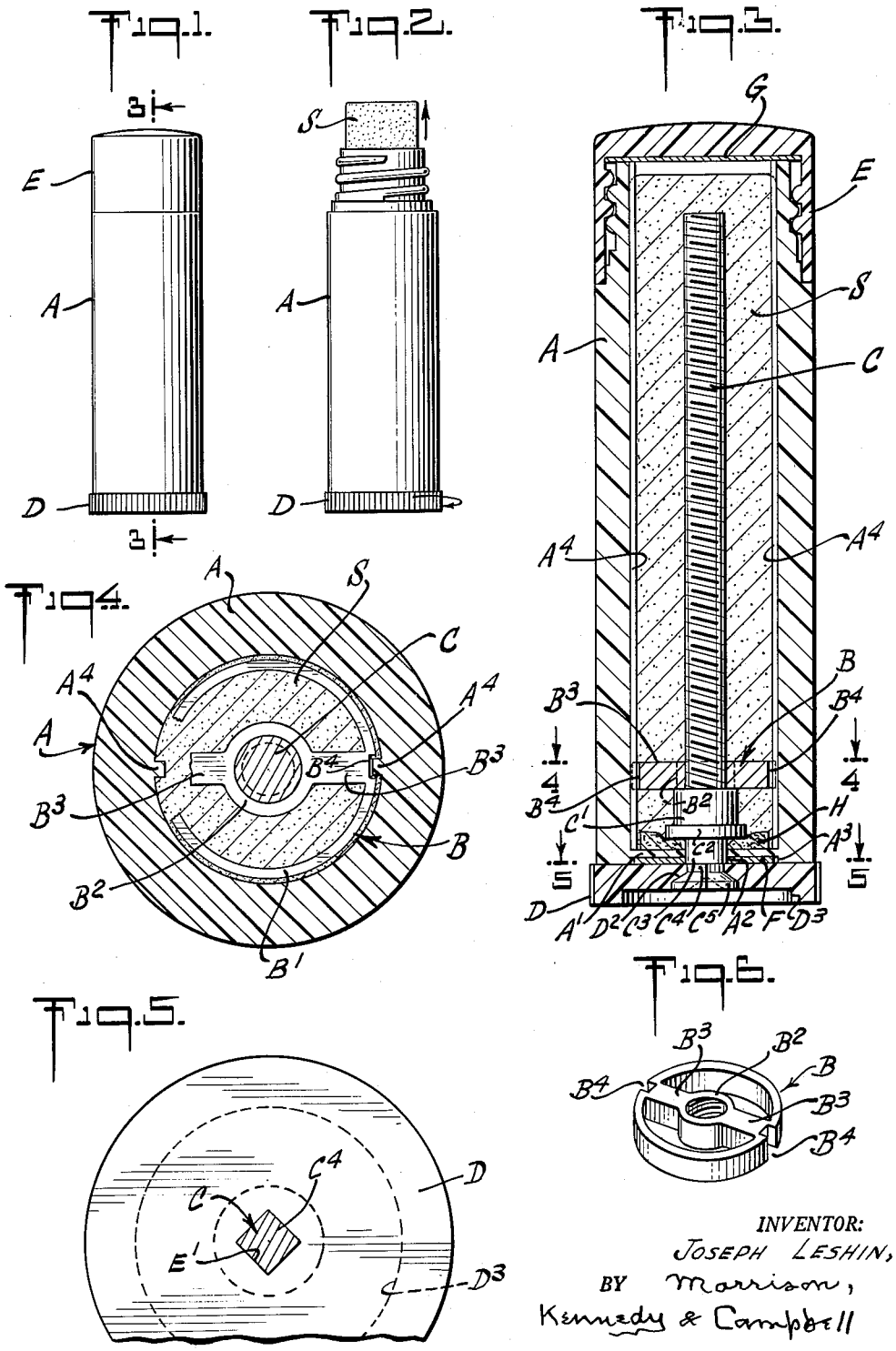

2,980,246

CONTAINER-DISPENSER FOR COSMETICS IN SOLID STICK FORM

Joseph Leshin, Bronx, N.Y., assignor to Calumet Manufacturing Co., Inc., a corporation of New York Filed July 9, 1952, Ser. No. 297,869

1 Claim. (Cl. 206—56)

This invention relates to container-dispensers for cosmetics in solid stick form, such as cologne sticks, perfume sticks, deodorant sticks, shaving sticks, cream sticks, et cetera. These sticks may contain alcohol, essential oils, deodorants, fatty acids and the like.

General objects of the invention are to provide a container-dispenser which is of simple, cheap, practical and durable construction; which is sealed when not in use to prevent leakage or evaporation of the volatile substances contained in the sticks; which will not contaminate the sticks or suffer deterioration from the substances which they contain, and which will act as a mold to permit the sticks to be cast directly therein, instead of being cast in separate molds as ordinarily.

In the specific embodiment illustrated, the container-dispenser comprises a tubular—preferably cylindrical—body closed at the bottom but open at the top for the projection of the stick, a follower embedded in the stick and slidably engaged with ribs on the body to project the stick from or retract it into the body, a long screw-threaded stem extending axially within the body and rotatably mounted in the bottom wall of the body, said stem being threaded to the follower for raising and lowering it within the body, a turning knob also rotatably mounted at the base of the body and rigidly secured to the stem for rotating the latter in opposite directions to actuate the follower, and a removable cover to close the body at the top. All of these parts are composed of molded plastic material which will posses the properties above stated and which will be completely inert with respect to the substances composing the cosmetic sticks. Preferably, and in actual practice, the body, the turning knob and the cover will be composed of a thermosetting plastic material, such as urea formaldehyde, while the screw-threaded stem and follower will be composed of a thermoplastic material, such as nylon, this latter material being sufficiently heat-resistant to allow the cosmetic material to be poured in hot liquid condition into the container for molding directly therein. The body of the container is sealed at the base by two washers, one arranged between the bottom of the body and a collar on the lower end of the threaded stem, and the other arranged between the bottom of the body and the rotatable knob which actuates the stem. The removable cover will also contain a washer for sealing the body at the top when the cover is in place.

Referring to the drawings:

Fig. 1 is an elevation of the complete container-dispenser with the removable cover in place;

Fig. 2 is a similar view, with the cover removed and showing the stick in process of projection by the turning of the knob at the base;

Fig. 3 is an enlarged longitudinal section taken along the line 3—3 of Fig. 1;

Fig. 4 is a transverse section, on an even larger scale, taken on the line 4—4 of Fig. 3 and showing the follower embedded in the stick;

Fig. 5 is a top plan view of the turning knob and showing the lower square end of the stem fitted into a square opening formed in the knob, whereby the rotation of the knob will be imparted to the stem; and Fig. 6 is a perspective view of the follower.

The complete container-dispenser comprises the following parts: a cylindrical body A, a follower B, a screw-threaded stem C, a base turning knob D, a removable cover E, and sealing washers F, G and H.

The body A has a relatively thin bottom wall $A^1$ formed with a centrally located hole or perforation $A^2$ of circular shape to accommodate the lower end of the rotatable stem C. The bottom wall is raised slightly above the lower end of the body to provide an annular well or recess $A^3$ for the reception of the washer F, which latter may be composed of felt or some other suitable material. On its inner wall, the body is formed with two long but narrow diametrically opposed guide ribs $A^4$ for the follower B. At the top, the body A is reduced in wall thickness and is exteriorly threaded to receive the interior threads of the removable cover E, it being noted that the cover when applied has its outer wall flush with the outer wall of the body. The removable cover contains the usual plastic sealing washer G for contacting the upper end of the cylindrical body A when the cover is applied.

The propelling and repelling of the cosmetic stick is effected by the follower B which is made of skeleton form to embed itself in the stick when the latter is molded in the container. In the form shown, the follower comprises a circular ring $B^1$ having a diameter slightly less than that of the inner wall of the cylindrical body A, a centrally located hub $B^2$ formed with interior screw threads to cooperate with the threaded stem C, and radially disposed cross bars $B^3$ which connected the hub with the ring. At the outer extremities of the cross bars the follower is formed with vertical through cuts or slots $B^4$ to receive the guide ribs $A^4$ within the body A.

The follower B is raised and lowered within the body A by the long screw-threaded stem C which is rotatably mounted at the base of the container and secured to the turning knob D. Here it may be noted that the screw threads of the follower B and the stem C are left-hand threads, so that when the knob D is rotated clockwise in the usual manner, the stick will be projected from the container. At its lower end, but spaced some distance above the bottom wall $A^1$ of the body, the stem C is formed with an enlarged non-threaded cylindrical boss $C^1$ which acts as a banking stop for the follower B in its lowermost position. This boss $C^1$, at its lower end, merges into an annular disk-like collar $C^2$ which is pressed down upon the sealing washer H, composed of cork or other suitable material, seated on the bottom wall $A^1$. Below the collar $C^2$, the stem C presents a plain cylindrical bearing portion $C^3$ rotatably mounted in the central aperture $A^2$ of the bottom wall $A^1$ and passing through similar perforations in the two washers H and F, respectively. Beneath the bearing portion $C^3$ and beyond the lower end of the body A, the stem is formed with a square portion $C^4$ which fits within a corresponding square aperture formed in the turning knob D. The extreme lower end of the stem C is hollowed out and is spread, as by swaging, into an enlarged flared base portion $C^5$ to make a permanent connection with the turning knob D. The circular base turning knob D is of slightly greater diameter than that of the body A and is ribbed or roughened to facilitate its rotation by hand. The upper face of the knob is flat and contacts with the lower cylindrical end portion of the body A, thus closing the recess $A^3$ which contains the sealing washer F. As above indicated, the knob has a central square aperture $E^1$ to receive the square portion $C^4$ of the stem C, and said aperture opens into a flared conical recess $D^2$ to receive the outwardly flared base portion $C^5$ of the stem. While not necessary, the knob is formed in its bottom face with an enlarged but shallow recess $D^3$ to contain and partly conceal the swage connection between the stem and the knob.

It will now be evident that when the parts are assembled, they will occupy the positions shown in Fig. 3, the two washers F and H providing a double seal at the bottom of the container-dispenser, one seal within the body A between the bottom wall $A^1$ and the stem collar $C^2$, and the other seal outside the body A between the bottom wall $A^1$ and the base turning knob D. The swage connection between the extreme lower end of the stem of the base turning knob will also have a sealing effect, preventing any leakage or evaporation around the bearing portion $C^3$ of the stem.

The method of assembly will also be obvious: The follower B may first be threaded onto the stem C down to the cylindrical boss $C^1$, and the stem then inserted into the body A from the top, with the follower slots $B^4$ in sliding engagement with the ribs $A^4$ on the inner wall of the body. The washer H will, of course, have been inserted, either over the bearing portion $C^3$ of the stem or on the bottom wall $A^1$ of the body. The washer F is then inserted over the lower protruding end of the stem C into the recess $A^3$ and up against the bottom wall $A^1$ of the body A. The turning knob D is next applied, being slipped over the lower protruding end of the stem C until it abuts against the lower circular end portion of the body A and with its square aperture $D^1$ fitted to the square portion $C^4$ of the stem. Finally, the swaging of the stem to the turning knob is effected, and the parts thus effectually held together in sealed and operating condition.

The casting of the stick in the container may now be carried out by pouring the material in a hot liquid condition from the top and allowing it to cool and solidify. As will be understood, the double seal at the bottom of the container will prevent the escape of the hot liquid material. Before or after the liquid congeals, the removable cover E may be applied, its washer G sealing the container at the top.

Due to its skeleton character and its location, when in its lowermost position, well above the bottom wall $A^1$ of the body A, the follower B will be completely embedded in the cast stick, as shown in Fig. 3, the molded stick being designated S. This embedding feature is important, since it insures that the stick will be propelled and repelled by the raising and lowering of the follower within the body, even if the stick (which is usually the case) is of such a nature that it becomes soft or oily when slightly warmed, as by contact with some part of the body of the user. However soft the stick becomes, there will be no leakage from the container to soil the personal effects of the user. Moreover, when the removable cover is applied to the container, no evaporation of the volatile contents of the stick material may take place. The plastic material is of such nature that it avoids contamination of the stick and also resists any attack from the ingredients of the stick; in fact, the urea formaldehyde material which composes the body, cover and turning knob, as well as the nylon material which composes the follower and stem, are completely inert with respect to any of the ingredients of the stick material, either in its hot liquid condition during casting or later on when the stick is in use.

Although a specific embodiment has been herein shown and described, it is to be understood that the invention is not limited thereto, as it is obvious that various changes may be made in the details of construction and arrangement of parts without departing from the spirit of the invention or the scope of the following claim.

What is claimed is:

A liquid-tight and air-tight container-dispenser for cosmetics in solid stick form and of the volatile variety comprising a tubular body with a bottom wall, an interiorly threaded follower arranged within the body and having a slidable but non-rotatable engagement therewith, said follower being of skeleton form to embed itself in the stick when the stick material is poured in hot liquid state into the body for casting, an exteriorly threaded stem also arranged within the body and having cooperative engagement with the follower, said stem being rotatably mounted at its lower end on the bottom wall of the body, and a rotatable knob arranged outside of the body at the base of the container-dispenser and secured non-rotatably to the stem.

References Cited in the file of this patent

UNITED STATES PATENTS

| | | |
|---|---|---|
| 758,234 | Bardin | Apr. 26, 1904 |
| 964,451 | O'Byrne | July 12, 1910 |
| 1,461,680 | Root | July 10, 1923 |
| 1,953,296 | Gleeson | Apr. 13, 1934 |
| 2,506,984 | Anderson | May 9, 1950 |
| 2,629,123 | Mahruki | Feb. 24, 1953 |

FOREIGN PATENTS

| | | |
|---|---|---|
| 570,255 | France | Jan. 15, 1924 |
| 714,968 | France | Sept. 14, 1931 |